(12) United States Patent
Kato

(10) Patent No.: US 7,164,988 B2
(45) Date of Patent: Jan. 16, 2007

(54) MAP DISPLAY SYSTEM

(75) Inventor: Noriko Kato, Obu (JP)

(73) Assignee: Denso Corporation, Kariya (JP)

( * ) Notice: Subject to any disclaimer, the term of this patent is extended or adjusted under 35 U.S.C. 154(b) by 242 days.

(21) Appl. No.: 10/747,214

(22) Filed: Dec. 30, 2003

(65) Prior Publication Data
US 2004/0158399 A1    Aug. 12, 2004

(30) Foreign Application Priority Data
Feb. 12, 2003  (JP) ............................. 2003-033976

(51) Int. Cl.
*G01C 21/30* (2006.01)

(52) U.S. Cl. ................... 701/209; 701/207; 701/208; 701/211; 340/988; 340/990; 340/995.16; 340/995.19

(58) Field of Classification Search ........ 701/207–211, 701/200–202; 340/988–990, 995.1, 995.16, 340/995.19, 995.21, 995.23
See application file for complete search history.

(56) References Cited

U.S. PATENT DOCUMENTS

| | | | | |
|---|---|---|---|---|
| 5,231,584 A | * | 7/1993 | Nimura et al. | 701/202 |
| 5,377,113 A | * | 12/1994 | Shibazaki et al. | 701/209 |
| 6,353,797 B1 | * | 3/2002 | Heideman | 701/207 |
| 6,424,363 B1 | * | 7/2002 | Matsuba et al. | 715/864 |
| 6,446,000 B1 | * | 9/2002 | Shimabara | 701/209 |
| 6,859,723 B1 | * | 2/2005 | Yokota | 701/201 |
| 6,950,744 B1 | * | 9/2005 | Daizen | 701/209 |

FOREIGN PATENT DOCUMENTS

| | | | |
|---|---|---|---|
| JP | A-61-229199 | | 10/1986 |
| JP | 02210600 A | * | 8/1990 |
| JP | A-H02-210599 | | 8/1990 |
| JP | 03157800 A | * | 7/1991 |
| JP | U-05-096868 | | 12/1993 |
| JP | A-09-292253 | | 11/1997 |
| JP | A-H11-72341 | | 3/1999 |
| JP | A-2002-39776 | | 2/2002 |

OTHER PUBLICATIONS

Notice of Reason for Rejection from Japanese Patent Office issued on Jun, 27, 2006 for the corresponding Japanese patent application No. 2003-033976 (a copy and English translation thereof).

* cited by examiner

*Primary Examiner*—Gertrude A. Jeanglaude
(74) *Attorney, Agent, or Firm*—Posz Law Group, PLC

(57) ABSTRACT

As the name of a given road is inputted, intersecting roads that share nodes such as an intersecting, merging, or branching point with the given road are designated. From the given road's nodes shared by the designated intersecting roads, the nearest node to the present position is displayed along with its peripheral map. A portion of the given road that is far from the present position is thereby prevented from being displayed along with its peripheral map. This can eliminate additional manipulation such as changing a reduction scale of the displayed map or repeatedly scrolling the displayed map till an objective point is being displayed. As a result, operationality can be enhanced in designating a point such as an objective point by using a name of a road.

20 Claims, 5 Drawing Sheets

MAP DISPLAY SYSTEM

CROSS REFERENCE TO RELATED APPLICATIONS

This application is based on and incorporates herein by reference Japanese Patent Application No. 2003-33976 filed on Feb. 12, 2003.

FIELD OF THE INVENTION

The present invention relates to a map display system, for instance, to be used in a navigation device. For instance, the map display system is capable of enhancing operationality in designating a point by using a road name.

BACKGROUND OF THE INVENTION

In a navigation device, when a pass point between objective points is set, a user is sometimes required to input a road name. Here, for instance, when the user inputs the name of a road to set the road itself as an objective point, the road corresponding to the inputted name and its peripheral map are displayed. The user then scrolls the map displayed on the screen till the objective point of the road can be displayed. The user finally designates the objective point being displayed on the screen.

In the conventional navigation device, when a peripheral map corresponding to an inputted road name is displayed, a typical point of the road is displayed. The typical point is, for instance, an intermediate point of the entire length of the road. When the typical point is far from an objective point, the user is thereby required to change a reduction scale of the map or repeatedly scroll the displayed map till the objective point is displayed.

SUMMARY OF THE INVENTION

It is an object of the present invention to provide a map display system capable of enhancing operationality in designating a point such as an objective point or a pass point by using a road name.

To achieve the above and other objects, a map display system is provided with the following. Map data and intersection data are stored. The map data is used to draw a map. The intersection data includes names of roads and data of nodes of the respective roads. Each of the nodes is an intersecting point, a branching point, or a merging point. A name of a given road and data of nodes of the given road are mutually correlated. Here, a name of a road is inputted. Nodes are designated, in ascending order of distances between the designated nodes and a given point, with reference to intersection data corresponding to the inputted name of the road. One of the designated nodes is displayed on a screen along with a peripheral map corresponding to the one of the designated nodes.

In this structure, as a user inputs a name of a road, corresponding nodes such as an intersecting point, a merging point, or a branching point are designated. From the corresponding nodes, the nearest node from the present position is displayed along with its peripheral map. For instance, when an objective point of a guidance route is to be set, input of a road name as an objective can lead to designating of the entire nodes corresponding to the inputted road name. For instance, the nearest node from the present position is designated and displayed along with its peripheral map on a screen of a display. A node being far from the present position is not thereby displayed, so that the user is not required to execute additional manipulation such as frequently changing reduction scales of map, or repeatedly scrolling the displayed map till the objective point can be displayed. This results in enhancement of operationality in designating, by using a road name, a point such as an objective point.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
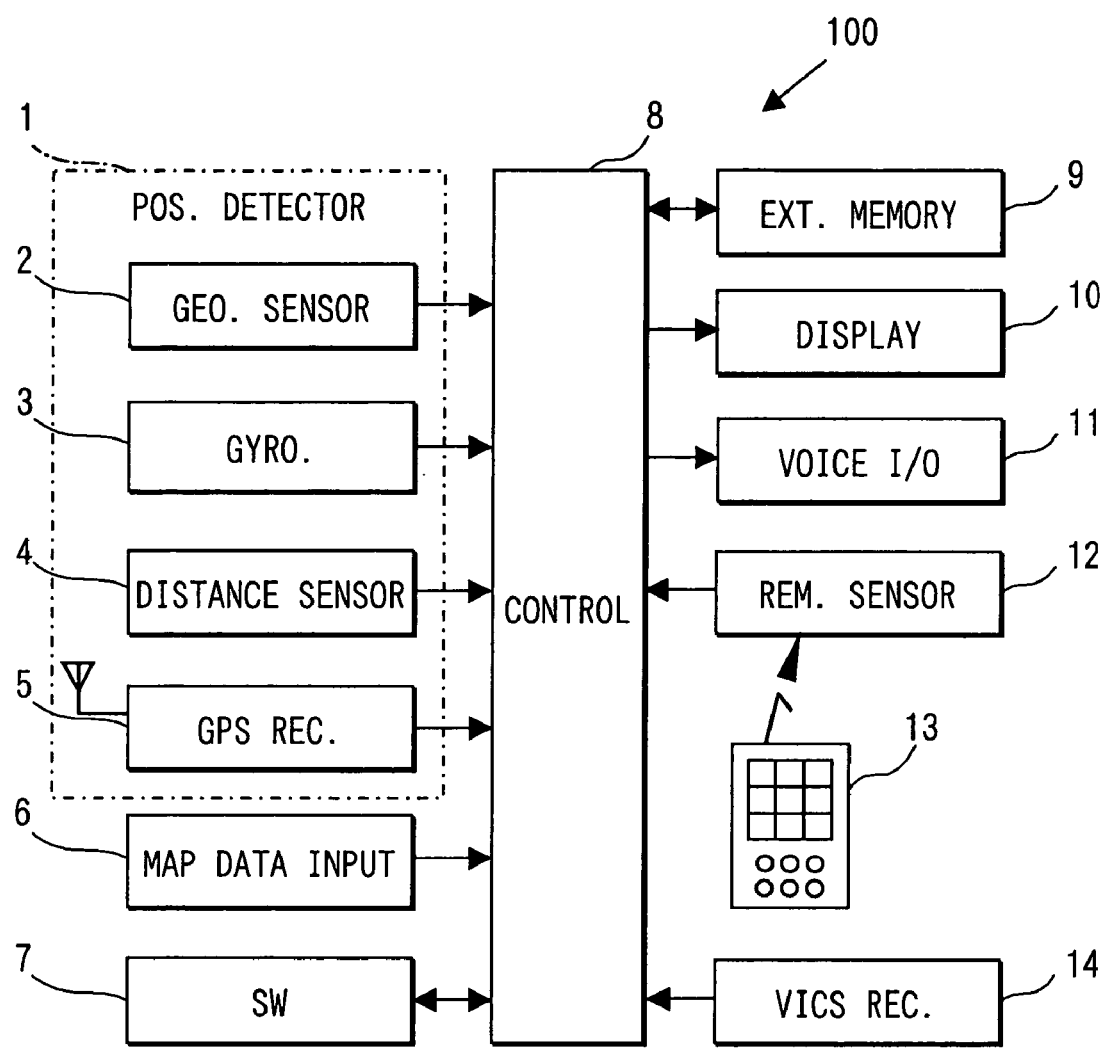
FIG. 1 is a schematic block diagram showing an overall structure of a navigation device according to an embodiment of the present invention.

A map display system according to an embodiment of the present invention applies to a navigation device as one function. An overall structure of a navigation device 100 is shown in FIG. 1.

The navigation device 100 mounted in a vehicle is equipped with: a position detector 1; a map data input unit 6; a manipulation switch group 7; an external memory 9; a display 10; a voice I/O unit 11; a remote controller sensor 12; a VICS (Vehicle Information and Communication System) receiver 14; and a control circuit 8 connecting with the preceding units.

The control circuit 8 is constructed of a common microcomputer including a CPU, a ROM, a RAM, an I/O, and a bus line intermediating between the preceding components. A program executed by the navigation device 100 is stored in the ROM. According to the program, the CPU executes given processing. The program can be externally obtained via the external memory 9.

The position detector 1 includes: a geomagnetic sensor 2; a gyroscope 3; a distance sensor 4; a GPS (Global Positioning System) receiver 5 for detecting a present position of the vehicle based on radio waves from GPS satellites. Each sensor 2 to 5 has a different characteristic and detection accuracy, so that high position detection accuracy is obtained by adjusting the respective errors through combining signals from the sensors 2 to 5. The position detector 1 can be constructed of some of the sensors 2 to 5 depending on the detection accuracy of the respective sensors. Furthermore, a rotation sensor of a steering (not shown) or a speed sensor of a steering wheel can be used as one of the sensors.

The map data input unit 6 is for inputting various data such as map data, landmark data, background data, etc. The map data input unit 6 sends the various data based on a request from the control circuit 8. A storage medium for the various data commonly uses a CD-ROM or a DVD due to its data amount, but a rewritable storage medium such as a memory card or a hard disk is used in the embodiment. The map data is constituted by link data, node data, and intersection data. These will be explained below.

A road is indicated using a link and a node. The node includes an intersecting point, a merging point, a branching point, or the like. Namely, a given road intersects with a certain road via a node of an intersecting point, a give road merges with a certain road via a node of a merging point, or a given road branches into a certain road via a node of a branching point. Here, in any case, the given road shares a node with the certain road. In addition, an intersection is used to be equivalent to a node. The links are defined as being between the nodes. The road is thereby constituted by connecting the links. Link data includes: a unique number (link ID) identifying a link; length of the link; coordinates (i.e., longitudes and latitudes) of nodes of terminating and starting ends of the link; a road name; a road kind; a road width; the number of lanes; a speed limit; and the like.

Node data includes: a unique number (node ID) identifying a node; node coordinates; a node name; connecting link IDs of the links connecting with the node; an intersection kind; and the like.

Figure 2:
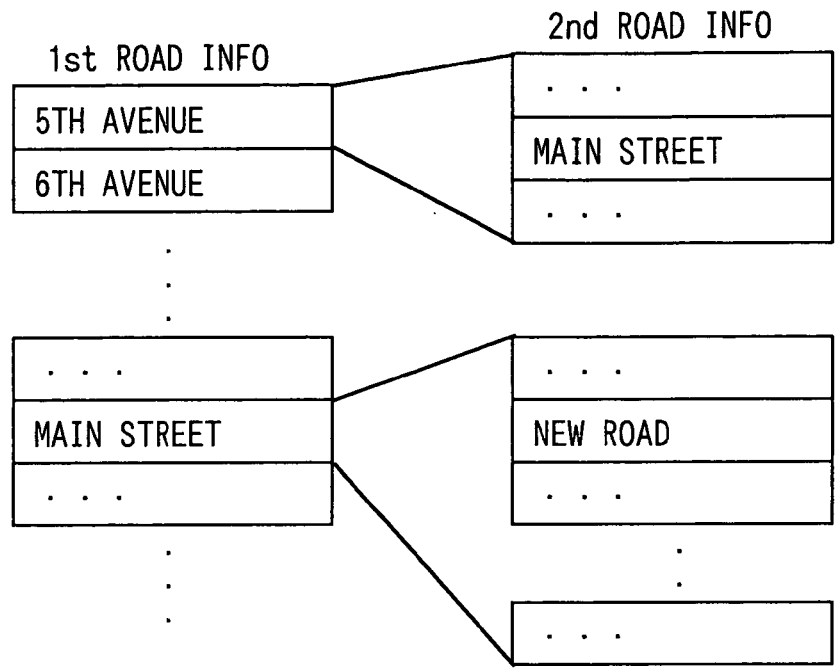
FIG. 2 is a diagram showing a structure of intersection data according to the embodiment.

By contrast, the intersection data is used in point designating processing using a road name, which will be explained later. In the intersection data, a road is related, using road names, with other roads with which the road intersects and shares nodes such as an intersecting point, a branching point, or a merging point. A structure of the intersection data is shown in FIG. 2.

The intersection data is formed of first road information and second road information. The first road information includes name data of entire roads that can be displayed on the display 10. The second road information includes name data of other roads which share nodes with the respective roads included in the first road information. In detail, in FIG. 2, with respect to "5th_AVENUE" in the first road information, "5th_AVENUE" shares nodes with other roads such as "MAIN STREET" included in the second road information.

Further, with respect to each road name in the second road information, data of coordinates (e.g., longitude and latitude) of a corresponding node and data of place names which the road passes through are stored and related. Here, the corresponding node is a node that is shared with the road included in the first road information. The place names are, for instance, a state, city, etc. in U.S.

The manipulation switch group 7 includes touch panel switches that are integrated with the display 10 or mechanical switches disposed around the display 10 to be used to execute various input such as scrolling a displayed map or inputting characters.

The display 10 can be a liquid crystal display (LCD). The display 10 displays a road map overlapped with additional data such as an own vehicle mark that is designated based on signals outputted by the position detector 1 and the map data inputted from the map data input unit 6.

The voice I/O unit 11 is constructed of an input unit and output unit (not shown). The input unit recognizing contents of user's utterance is used to input for the navigation device 100. The output unit constructed of a speaker, an audio amplifier, or the like is used for voice guidance.

The VICS receiver 14 receives information such as road traffic information delivered from a VICS center via a beacon laid in a road or a local FM broadcast station.

In the navigation device 100 of the embodiment, when an objective point is designated via the manipulation switch group 7, a remote controller 13, or the like, an appropriate route from the present position to the objective point is automatically selected to form and display a guidance route. Namely, the navigation device 100 has a function of route guidance.

The automatic designating of an appropriate route is executed, for instance, by cost computing using known Dijkstra method. Here, a route reaching an objective point at the minimum cost is computed using costs assigned to links by considering link length, road kinds, road width, or the like. In addition, the navigation device 100 has a function of designating, using a road name, an objective point or a pass point on the guidance route.

These functions are realized mainly by the control circuit 8 executing various processing. Namely, when an object point is designated, the control circuit 8 computes a route using map data of the map data input unit 6 to display the computed route on the display 10. When the vehicle reaches a branching point or an intersecting point of turning left/right on the computed route, the map is enlarged and the corresponding voice guidance is executed.

Figure 4:
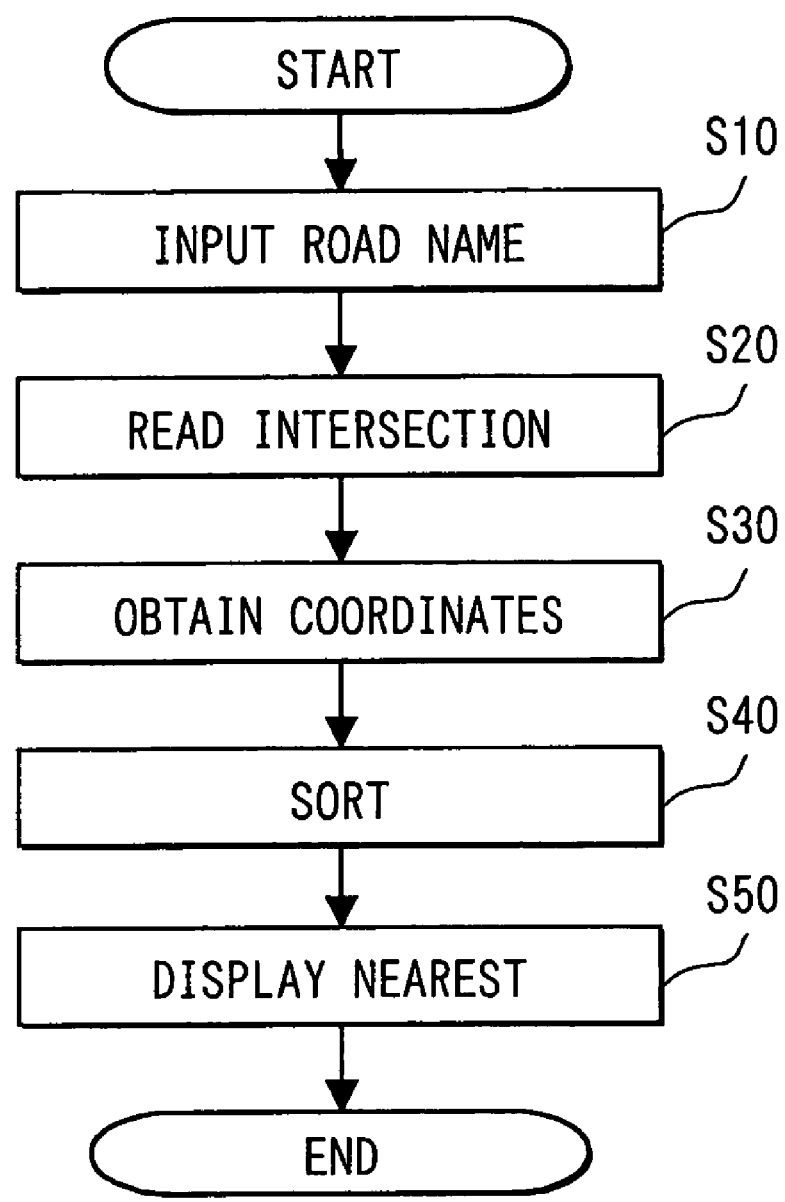
FIG. 4 is a flowchart diagram explaining point designating processing using a road name according to the embodiment.

In the route guidance function, point designating processing is to designate using a road name an objective point, a pass point, or the like of a guidance route. The point designating processing will be explained mainly with reference to a flowchart in FIG. 4. Here, explanation will be executed regarding a case where an objective point of a guidance route is designated.

Figure 3:
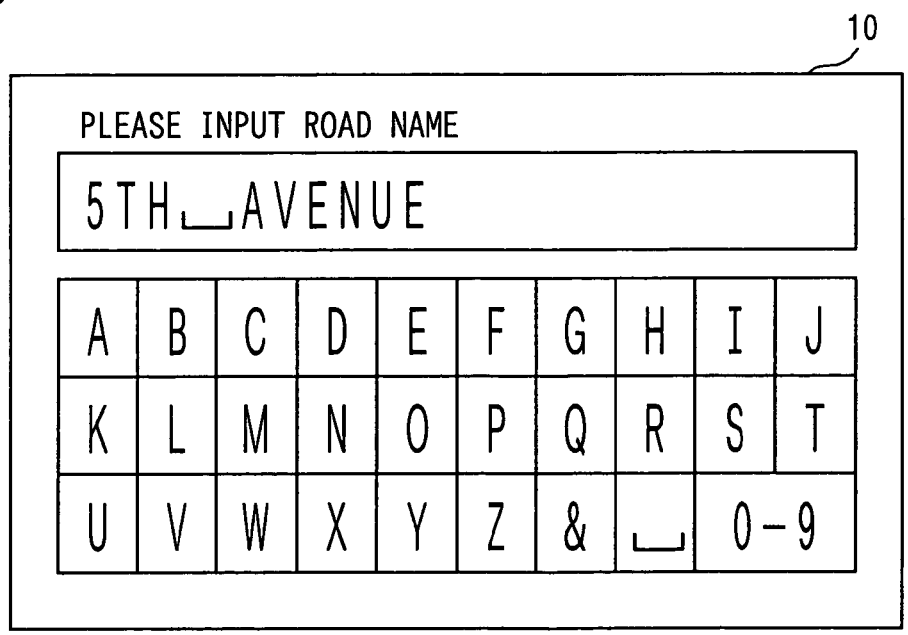
FIG. 3 is a diagram showing a road name input window on a display according to the embodiment.

At Step 10, a road name of an objective is inputted. For instance, as shown in FIG. 3, the display 10 displays, on the screen, keys of alphabetical characters and numerals for a user to input the road name. The road name can be also input when the voice I/O unit 11 recognizes the road name uttered by the user. Furthermore, a road name list can be prepared for user to designate the road name from the list. Here, the list is displayed in an alphabetical order of the first character of the road names. In the embodiment, suppose that the user inputs "5th_AVENUE."

Figure 5:
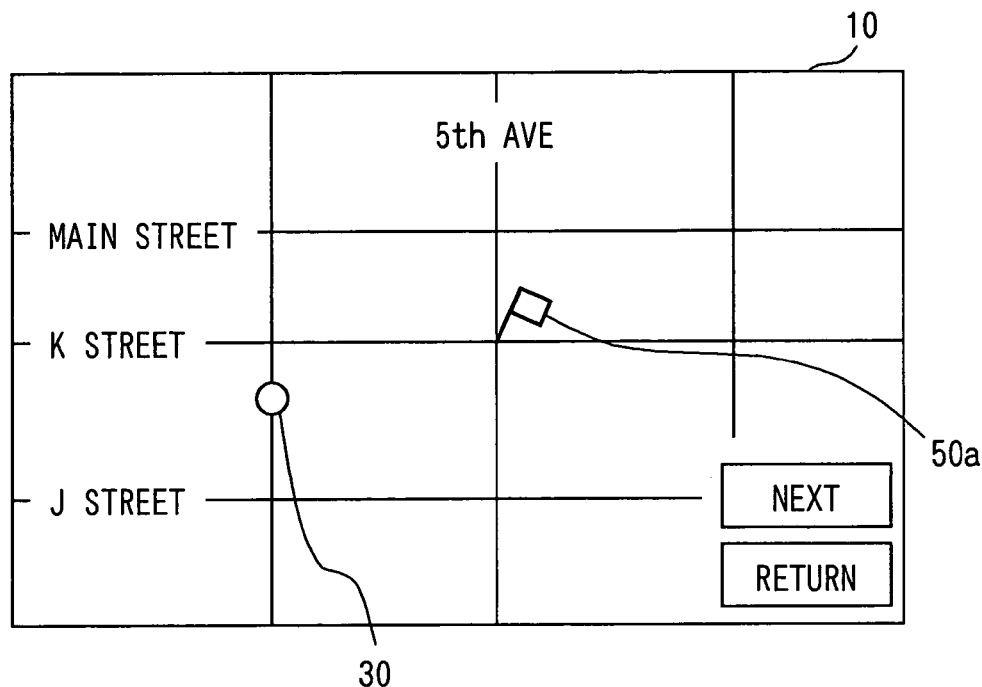
FIG. 5 is a diagram showing an instance of displaying an intersection on a display according to the embodiment.

At Step 20, intersection data of roads that share the intersecting, branching, or merging point with the road of the inputted road name is read. In the embodiment, intersection data of three roads of "MAIN_STREET," "K_STREET," and "J_STREET," shown in FIG. 5, are read. At Step 30, coordinates of the present position are obtained from the position detector 1.

At Step 40, the intersection data is re-sorted in ascending order of distances from the present position based on the coordinates corresponding to the intersection data read at Step 20 and the coordinates of the present position obtained at Step 30.

For instance, re-sorting can be done using airline (straight) or traveling distances between the present position and the corresponding node. In the embodiment, based on the straight distance, "K_STREET," "MAIN_STREET," and "J_STREET" are re-sorted in order.

Here, when the sorting is done using the straight or traveling distance, the distance can have a limit for re-sorting. Namely, intersections having distances exceeding the limit can be precluded from being re-sorted.

At Step 50, from the re-sorted intersection data, the intersection of "K_STREET" having the shortest distance from the present position and its peripheral map are displayed on the display 10. For instance, as shown in FIG. 5, an intersection 50a between "5th_AVENUE" and "K_STREET" is disposed around a center of the window of the display 10.

An intersection with "J_STREET" having the second shortest distance or an intersection with "MAIN_STREET" having the third shortest distance can be displayed along with its corresponding peripheral map when the user selects "NEXT" key. When the user then selects "RETURN" key, the intersection having the shortest distance is again displayed.

The intersection having the shorting distance is thus firstly displayed along with its peripheral map, so that the user easily grasps, in order starting from the intersection having the shortest distance, the position relation with the present position.

Figure 6:
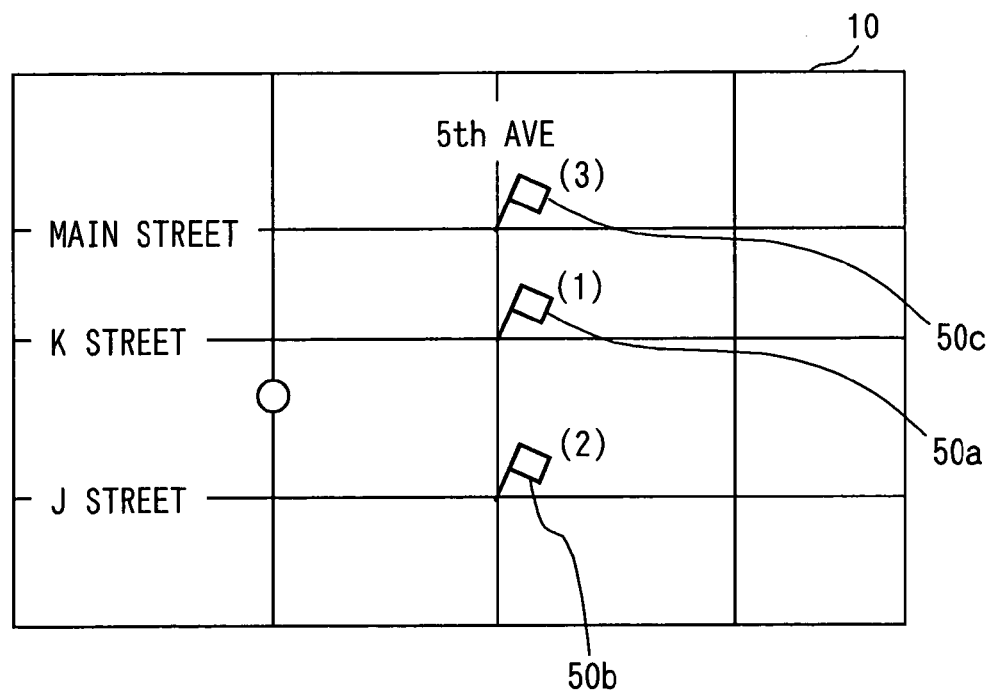
FIG. 6 is a diagram showing an instance of displaying all intersections on a display according to the embodiment.

At Step 50, as shown in FIG. 6, another method can be adopted. Here, a reduction scale of the map is adjusted to be able to display the three intersections 50a, 50b, 50c of "5th_VENUE" with the roads of "K_STREET," "J_STREET," and "MAIN_STREET." Three intersections are thereby displayed with the numbers of (1), (2), (3) assigned to them in ascending order of the distances. When the user selects one of the numbers, the intersection corresponding to the selected number can be then displayed with its peripheral map being enlarged.

As explained above, in the navigation device 100 of the embodiment, as the user inputs a road name, nodes (or intersections) of the road of the inputted road name are designated. Simultaneously, roads sharing the nodes with the road of the inputted road name are designated. From the designated intersections, the intersection nearest to the present position is displayed along with its peripheral map.

For instance, when an objective point of a guidance route is to be set, input of a road name of an objective leads to designating of the entire nodes corresponding to the inputted road name. On the screen of the display 10, for instance, the node nearest to the present position is designated from the designated nodes and displayed along with its peripheral map and the corresponding road name. A node being far from the present position is not thereby displayed, so that the user is not required to execute additional manipulation such as frequently changing reduction scales of map, or repeatedly scrolling the displayed map till the objective point can be displayed. This results in enhancement of operationality in designating a point such as an objective point by using a road name.

Furthermore, in the embodiment, displaying nodes and their peripheral maps can be switchable in ascending order of nodes' distances from the present position. For instance, displaying the node and its peripheral map is executed from the node nearest to a given point such as the present position or an objective point. The user can thereby grasp position relation of the nodes in order starting from the node nearest to the given position.

Furthermore, in the embodiment, intersection data is re-sorted in ascending order of distance based on the present position. For instance, when a pass point is to be set within a guidance route between the previously set starting and objective points, the re-sorting can be done based on the starting or objective point. Furthermore, when a starting point is to be set within a guidance route from the previously set objective point, the re-sorting can be done based on the objective point.

(First Modification)

At Step 40 in the embodiment, the intersection data is re-sorted in ascending order of distances from the present position based on the coordinates corresponding to the intersection data read at Step 20 and the coordinates of the present position obtained at Step 30. However, a road name list indicating the result of re-sorting the intersection data can be displayed for a user to select a road name that is to be displayed.

Figure 7:
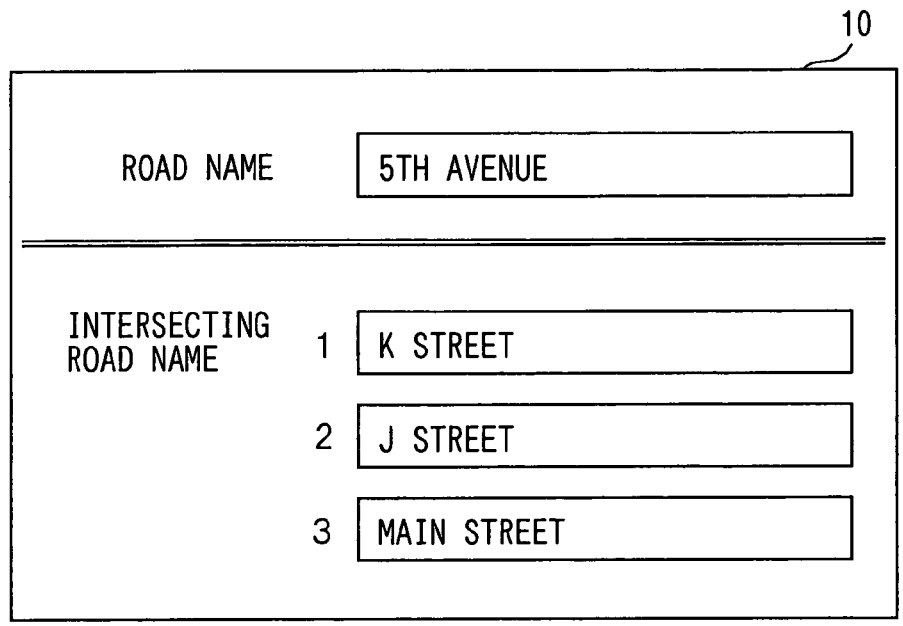
FIG. 7 is a diagram showing an instance of displaying a list of road names on a display according to a first modification of the embodiment.

For instance, at Step 40, after re-sorting the intersection data, a road name list can be displayed as shown in FIG. 7. Here, the list shows, from the top to the bottom, names of the roads that are sorted in ascending order of the distances from the present position. The user then selects a given one of the names of the roads, the given one which is to be displayed. When the list cannot be shown in one-page window of the display 10, road names are displayed by using page forwarding or upward/downward scrolling. The user can thereby easily select the name of a road sharing a node that is the nearest to the present position.

(Second Modification)

Figure 8:
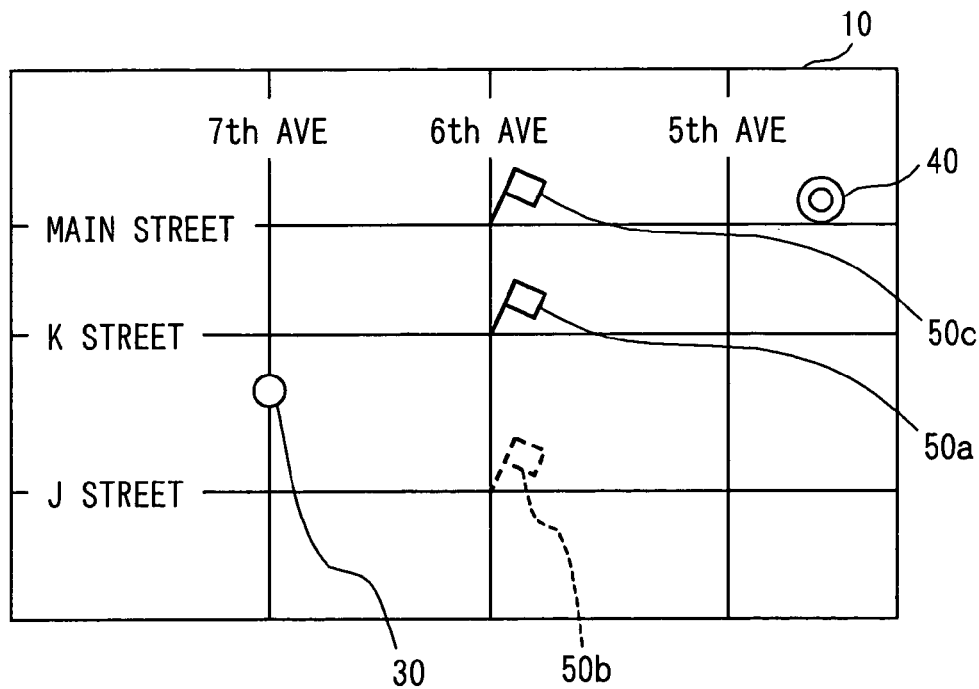
FIG. 8 is a diagram showing an instance of displaying pass points on a display according to a second modification of the embodiment.

For instance, as shown in FIG. 8, suppose that an objective point 40 of a guidance route is previously set and that a pass point on the guidance route from the present position to the objective point is to be set. At Step 40 of the second modification, nodes being located towards the objective point from the present position are only designated to be re-sorted while nodes not being located towards the objective point are eliminated from being re-sorted.

Namely, as shown in FIG. 8, in order to eliminate a node 50b making a detour to an objective point 40, the corresponding intersection data of "J_STREET" is eliminated. The intersection data can be eliminated based on position relation between the present position of the starting point 30 and the objective point 40. For instance, suppose that setting a re-sorting region having a given width or a given angle around a straight line from the present position 30 to the objective point 40. Only the intersection data corresponding to the inside of the region is re-sorted while the intersection data corresponding to the outside of the region is eliminated from being re-sorted. Selecting the intersection data is not limited to the above method, but also other methods can be adopted instead. In any case, elimination of the intersection data of the node making a detour or being located not towards the objective point leads to preventing nodes and their peripheral maps unnecessary for the user from being displayed.

(Third Modification)

In the embodiment, as the user inputs the name of a given road, the corresponding intersection data including other roads that share nodes with the given road is read. However, of the given road, a point nearest to the present position or the like can be designated, so that a peripheral map of the point can be displayed.

Namely, points of the given road corresponding to the road name inputted by the user can be designated using the link data and node data of the given road. Accordingly, for instance, a point that has the shortest straight or traveling distance from the present position can be designated, and the peripheral map of the designated point of the given road can be displayed. The user is thereby not required to additional manipulation such as repeatedly scrolling the displayed map till the objective point is displayed on the screen.

It will be obvious to those skilled in the art that various changes may be made in the above-described embodiments of the present invention. However, the scope of the present invention should be determined by the following claims.

What is claimed is:

1. A map display system comprising:
a map data storing unit for storing map data used to draw a map and intersection data, wherein the intersection data includes names of roads and data of nodes of the respective roads, wherein each of the nodes includes at least one of an intersecting point, a branching point, and a merging point, wherein a name of a given road and data of nodes of the given road are mutually correlated;
a road name input unit for inputting only a name of a road so as to prevent limitation of the road;
a point designating unit for designating nodes, in ascending order of distances between the respective designated nodes and a given point, with reference to intersection data corresponding to the inputted name of the road; and
a display control unit for displaying on a screen one of the nodes designated by the point designating unit and a peripheral map corresponding to the one of the designated nodes.

2. The map display system of claim 1,
wherein the point designating unit designates the nodes, in the ascending order of the distances from the respective designated nodes to the given point that is one of a present position, an objective point, and a pass point within a route from the present position to the objective point.

3. The map display system of claim 1,
wherein the display control unit displays the one of the nodes designated by the point designating unit and the peripheral map corresponding to the one of the designated points by switching the designated nodes and the peripheral maps corresponding to the respective designated nodes in the ascending order of the distances between the respective designated nodes and the given point.

4. The map display system of claim 1, further comprising:
a route computing unit for computing a route from a starting point to an objective point,
wherein the route computing unit sets one of the nodes designated by the point designating unit as one of a starting point, an objective point, and a pass point within the route from the starting position to the objective point.

5. The map display system of claim 4,
wherein, when the route computing unit computes the route from the starting point to the objective point, the point designating unit designates the nodes that are located within a limited region including a line connecting between the starting point and the objective point.

6. A map display system comprising:
a map data storing unit for storing map data used to draw a map and intersection data, wherein the intersection data includes names of roads, data of nodes of the respective roads, and names of intersecting roads, wherein each of the nodes includes at least one of an intersecting point, a branching point, and a merging point, wherein a given road shares nodes of the given road with given intersecting roads with which the given road intersects, wherein a name of the given road, data of the nodes of the given road, and names of the given intersecting roads are mutually correlated;
a road name input unit for inputting only a name of a road so as to prevent limitation of the road;
a road designating unit for designating, with reference to intersection data corresponding to intersecting roads with which the road of the inputted name intersects, the intersecting roads in ascending order of distances between a given point and the respective nodes shared by the intersecting roads;
a list displaying control unit for displaying a list of the intersecting roads in the ascending order;
a selecting unit for selecting a certain road from the list; and
a display control unit for displaying on a screen a certain node that the selected certain road shares with the road of the inputted name and a peripheral map corresponding to the certain node.

7. The map display system of claim 6,
wherein the road designating unit designates the intersecting roads, in the ascending order of the distances between the given point and the respective nodes shared by the intersecting roads, wherein the given point is one of a present position, an objective point, and a pass point within a route from the present position to the objective point.

8. The map display system of claim 6, further comprising:
a route computing unit for computing a route from a starting point to an objective point,
wherein the route computing unit sets one of the nodes shared by the intersecting roads designated by the road designating unit as one of a starting point, an objective point, and a pass point within the route from the starting position to the objective point.

9. The map display system of claim 8,
wherein, when the route computing unit computes the route from the starting point to the objective point, the road designating unit designates the intersecting roads sharing the nodes that are located within a limited region including a line connecting between the starting point and the objective point.

10. A map display system comprising:
a map data storing unit for storing map data used to draw a map, and data of names and positions of roads that are displayed on the map;
a road name input unit for inputting only a name of a road and for not inputting additional information so as to prevent further limiting the road;
a position detector for detecting a present position;
a point designating unit for designating, of the road having the inputted name, a closest point that has a shortest distance from the detected present position; and
a display control unit for displaying on a screen the designated closest point by the point designating unit and a peripheral map corresponding to the designated closest point.

11. The map display system of claim 10,
wherein the additional information further limiting the road includes at least one of a block number, a house number, and an address number.

12. The map display system of claim 10,
wherein the display control unit displays on the screen the designated closest point and the peripheral map, with the designated closet point approximately centered in the screen.

13. The map display system of claim 10,
wherein the point designating unit selectively designates, of the road having the inputted name, only the closest point that has the shortest distance from the detected present position, and the display control unit displays on the screen the designated closest point and the peripheral map while explicitly displaying only the designated closest point among other points of the road having the inputted name.

14. The map display system of claim 10, wherein the closest point is included in nodes that are included in the road having the inputted name.

15. The map display system of claim 14, wherein
the closest point included in the nodes is represented by an intersecting road, with which the road having the inputted name intersects at the closest node, and
the designated closest point is shown on the screen by using a name of the intersecting road.

16. The map display system of claim 10, further comprising:
a route computing unit for computing a route from a starting point to an objective point,
wherein the route computing unit sets the closest point designated by the point designating unit as one of a starting point, an objective point, and a pass point within the route from the starting position to the objective point.

17. A method for displaying a map including a road in a map display system in a vehicle, the map displayed based on map data along with data of names and positions of roads, the method comprising:

detecting a present position of the vehicle;
inputting only a name of a certain road, the input of only the name of the certain road accompanied by no additional information further limiting the certain road;
designating a closest point associated with the certain road, the closest point designated based on being closest to the detected present position; and
displaying the designated closest point and its corresponding peripheral map, on a screen in the vehicle.

18. The method of claim 17,
wherein the additional information further limiting the road includes at least one of a block number, a house number, and an address number.

19. The method of claim 17,
wherein the designated closest point is included in nodes that are associated with the certain road and the data of names and positions of roads.

20. The method of claim 19, wherein:
the designated closest point included in the nodes is represented by an intersecting road with which the certain road intersects, and
the displaying includes showing the designated closest point on the screen by using a name of the intersecting road.

* * * * *